(12) United States Patent
McKee et al.

(10) Patent No.: US 7,472,684 B1
(45) Date of Patent: Jan. 6, 2009

(54) HIGH LOW ENGINE SPEED CRUISE CONTROL

(75) Inventors: Kevin D. McKee, Naperville, IL (US); Jeff Milender, Valley City, ND (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/985,175

(22) Filed: Nov. 14, 2007

(51) Int. Cl.
*F02D 31/00* (2006.01)
(52) U.S. Cl. ..................................... 123/352
(58) Field of Classification Search ............... 123/349, 123/350, 352
See application file for complete search history.

(56) References Cited

U.S. PATENT DOCUMENTS

| | | | |
|---|---|---|---|
| 4,117,903 A | 10/1978 | Fleischer et al. ............. 180/105 |
| 4,638,879 A | 1/1987 | Collonia ..................... 180/179 |
| 5,128,869 A | 7/1992 | Akishino et al. ......... 364/426.04 |
| 5,233,530 A | 8/1993 | Shimada et al. ......... 364/431.05 |
| 5,417,193 A | 5/1995 | Fillman et al. ............... 123/352 |
| 5,549,089 A | 8/1996 | Snell et al. .................. 123/352 |
| 5,713,428 A | 2/1998 | Linden et al. ............... 180/179 |
| 5,971,888 A * | 10/1999 | Goode ......................... 477/107 |
| 6,226,588 B1 | 5/2001 | Teramura et al. .............. 701/93 |
| 6,655,233 B2 * | 12/2003 | Evans et al. ................. 74/731.1 |
| 6,704,637 B1 * | 3/2004 | Hrazdera et al. .............. 701/93 |
| 6,859,716 B2 * | 2/2005 | Kikuchi ...................... 123/352 |
| 6,938,719 B2 * | 9/2005 | Ishimaru et al. ............. 180/305 |
| 7,066,863 B2 * | 6/2006 | Aumann ...................... 477/169 |

* cited by examiner

*Primary Examiner*—Erick Solis
(74) *Attorney, Agent, or Firm*—Patrick M. Sheldrake; John William Stader; Michael G. Harms

(57) ABSTRACT

A high low cruise control system for a work machine that allows the operator to set and adjust an upper engine speed limit in an upper limit mode or a lower engine speed limit in a lower limit mode and return to these set points easily. Without exiting the cruise control mode, the operator may decrease engine speed while in the upper limit mode, or increase engine speed while in the lower limit mode.

12 Claims, 3 Drawing Sheets

HIGH LOW ENGINE SPEED CRUISE CONTROL

TECHNICAL FIELD

This invention relates generally to engine speed control systems for work machines, such as tractors, utilized for a variety of purposes, and more particularly, to an engine speed control system operable for imposing a real-time, operator adjustable, upper or lower engine speed limit, while allowing operator control over engine speed below the upper speed limit or above the lower speed limit.

BACKGROUND ART

Work machines, such as tractors, utilized, for instance, for agriculture, construction, mining, earth-moving, and the like, are not typically powered in the same manner as road vehicles. In a work machine the throttle is used to increase engine speed to provide power to drive the work machine at a particular ground speed and to provide power to one or more other systems of the machine. It is advantageous to have the capability to operate these work machines under conditions where their engine speed is held closely to a setting set by the operator. However, many work machines are subjected to rapidly occurring and widely varying load conditions that require engine speed adjustments so as to make known ground speed cruise control systems unsatisfactory for use in automatic engine speed control systems.

Upper limit control of engine speed in a work machine would be desirable as it can help protect an engine from damage caused by abrupt machine unload conditions. In a most desired form, an upper limit engine speed control would allow an operator to set and adjust an engine speed upper limit that optimizes engine performance based on the work being performed by the machine. As work conditions change, for example, if the machine were to encounter an increased load, such as a tractor entering a more densely populated crop area, the operator would be able to increase the throttle position to maintain the optimized engine speed, and when the load returns to normal, the increased throttle position command would be limited by the engine speed control system without resetting the upper limit, exiting the system, or requiring repositioning of the throttle. If the machine were to encounter a decreased load, such as a tractor nearing the end of a swath of field, the operator would decrease engine speed from the optimized speed used for the field work, move to the next swath of the field, and continue working at the previously set, optimized engine speed without exiting the engine speed control mode. These capabilities are not achieved by known cruise control systems which focus on ground speeds.

Additionally, lower limit control of engine speed in a work machine would be desirable to help protect an engine from a stall condition caused by abrupt machine load conditions. Lower limit engine speed control would allow an operator to set and adjust an engine speed lower limit that optimizes engine performance based on the work being performed by the machine. For example, if the machine were to encounter an increased load, such as a tractor entering a more densely populated crop area, it would be desirable to have the capability for the operator to increase the throttle position to maintain the optimized engine speed, and when the load returns to normal, wherein if the operator removes the throttle input, and the throttle position command is limited by the engine speed control system without resetting the lower limit, or exiting the system. Again, because known cruise control system focus on ground speed of the vehicle, these capabilities are not achieved by known systems.

It would also be desirable for the operator to have the capability to adjust for varying load conditions during work, in real time, by allowing upward and downward adjustments of the designated engine speed limits without much effort.

One system, such as the one described in Linden et al., U.S. Pat. No. 5,713,428 discloses a ground speed control system with a cruise control mode and a mutually exclusive upper speed limitation mode. While this system may be useful for motor vehicles, it does not provide for engine speed control as required for work machines. The transmission systems in motor vehicles allow for wildly varying engine speeds to correspond to similar ground speed.

It is therefore desirable to have an engine speed control system with a mode which allows engine speed operation at or below an operator adjustable upper limit and a mode which allows engine speed operation at or above an operator adjustable lower limit which is simple and easy to operate and otherwise provides one or more of the advantages, benefits, or sought after capabilities or overcomes one or more of the shortcomings set forth above.

SUMMARY OF THE INVENTION

According to a preferred aspect of the invention, a High Low Cruise Control system (HLCC) is disclosed for an agricultural work machine, such as a tractor, that allows the operator to control engine speed via the throttle at engine speeds corresponding to the throttle position when commanding an engine speed below the operator adjustable upper limit or above the operator adjustable lower limit without exiting the control system.

The HLCC is a control system including an Upper Limit Mode (ULM) and a Lower Limit Mode (LLM). In ULM, throttle position will determine engine speed until the throttle is increased to the throttle position corresponding to an operator adjustable Engine Speed Upper Limit (ESUL). Once that throttle position is reached, further increases in throttle position will not increase engine speed. In LLM, throttle position will determine engine speed until the throttle is decreased below the throttle position corresponding to an operator adjustable Engine Speed Lower Limit (ESLL). Once that throttle position is reached, further decreases in throttle position will not decrease engine speed.

According to another preferred aspect of the invention, the ESUL or ESLL settings can be increased or decreased in a simple manner as a function of the previously set ESUL or ESLL. For example, an ESUL increase command would increase the ESUL by 2% in one embodiment of the invention.

In another preferred aspect, HLCC can be cancelled in a simple manner, such as depression of the clutch pedal.

In yet another preferred aspect of the invention, HLCC engine speed limits can be overridden by the work machine operator when required by using an accelerator pedal or decelerator pedal.

DETAILED DESCRIPTION OF THE INVENTION

Figure 1:
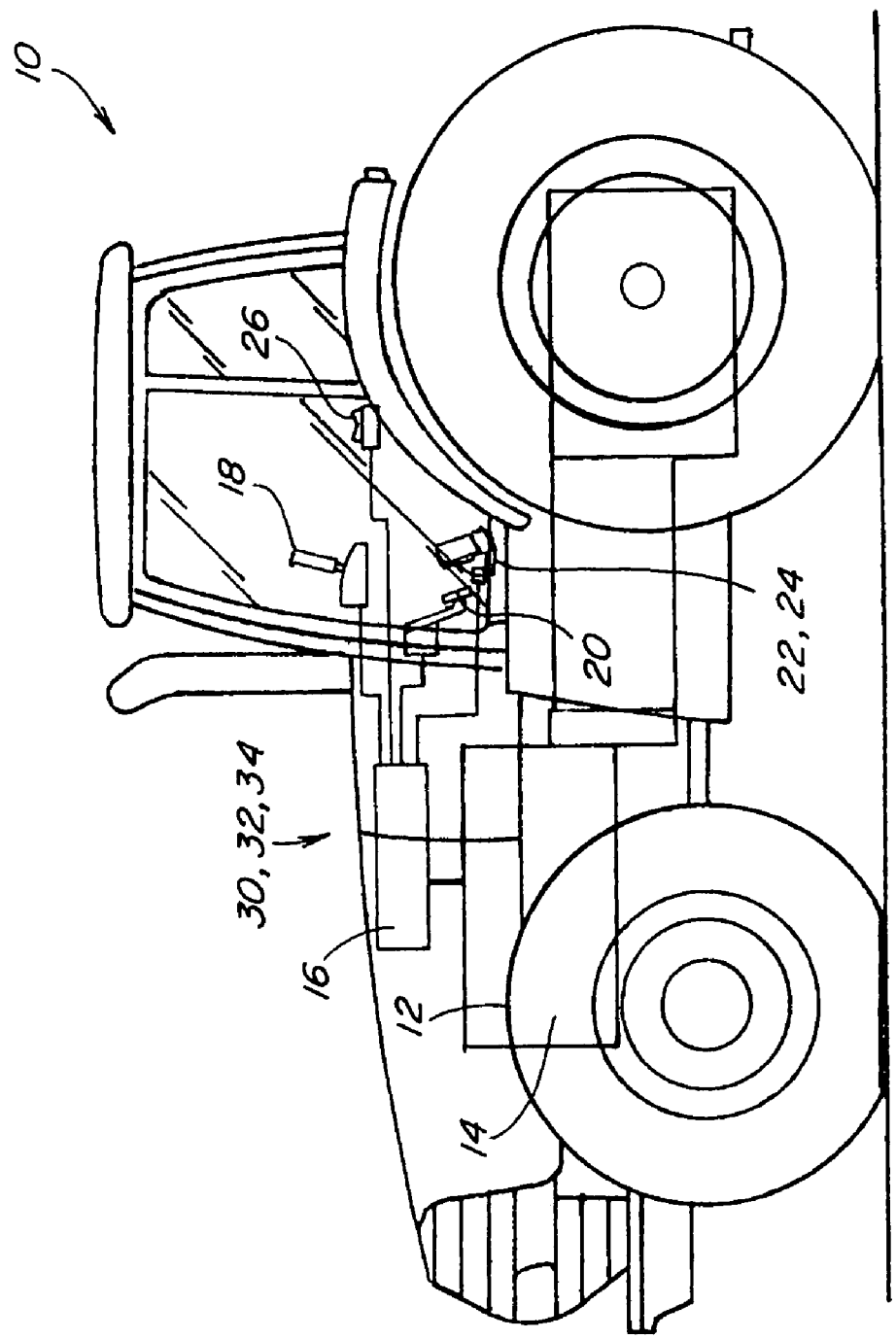
FIG. 1 is a simplified side view of a work machine.

Referring now to the drawings, wherein like numbers refer to like parts, FIG. 1 shows a simplified side view of a work machine 10 with an engine 12 equipped with a governor 14 and associated with an engine controller 16, receiving inputs from a throttle 18, a clutch pedal 20, an accelerator pedal 22 and/or a decelerator pedal 24. The work machine operator uses the position of throttle 18, and accelerator/decelerator pedal(s) 22, 24 to send engine speed commands to the engine 14 via engine controller 16, and governor 14 works within engine 12 to maintain commanded engine speed within a preset tolerance in the well known manner.

According to the invention, a high low engine speed cruise control system (HLCC) 30 provides operator control over engine speed in an upper limit mode (ULM) 32 or a lower limit mode (LLM) 34 by allowing the operator to set a limit for engine speed commanded by throttle 18, and then increase or decrease that limit, in real-time, as desired, based upon changing work conditions. HLCC 30 is initiated and adjusted using a HLCC switch 26 as shown in FIG. 1. Although it may be actuated in a variety of ways, this embodiment of the invention utilizes a three position, spring return to center switch with an increase (INC) position, a decrease (DEC) position, and a neutral center position. Depressing clutch pedal 20 to the BOC position cancels HLCC 30 and returns engine speed control to throttle 18, and accelerator/decelerator pedal(s) 22, 24.

In this embodiment of the invention, HLCC 30 is initiated and adjusted using switch 26 and canceled using clutch pedal 20. When neither mode of HLCC 30 is active, a switch 26 INC command enters and initializes ULM 32, while a switch 26 DEC command enters and initializes LLM 34. When operating in ULM 32, a switch 26 INC or DEC command increases or decreases the established upper limit (ESUL), and similarly when operating in LLM 34, a switch 26 INC or DEC command increases or decreases the established lower limit (ESLL). Once HLCC 30 enters ULM 32 or LLM 34, it adjusts engine speed limits (ESUL or ESLL), if commanded by the operator using switch 26 INC or DEC, compares the engine speed associated with throttle 18 position (ESTHR) to the established limit (ESUL or ESLL), and provides an engine speed command associated with throttle 18 (ESCOM). HLCC 30 will continue this process until the operator cancels ULM 32 or LLM 34 by depressing clutch pedal 20 to the BOC position.

Figure 2:
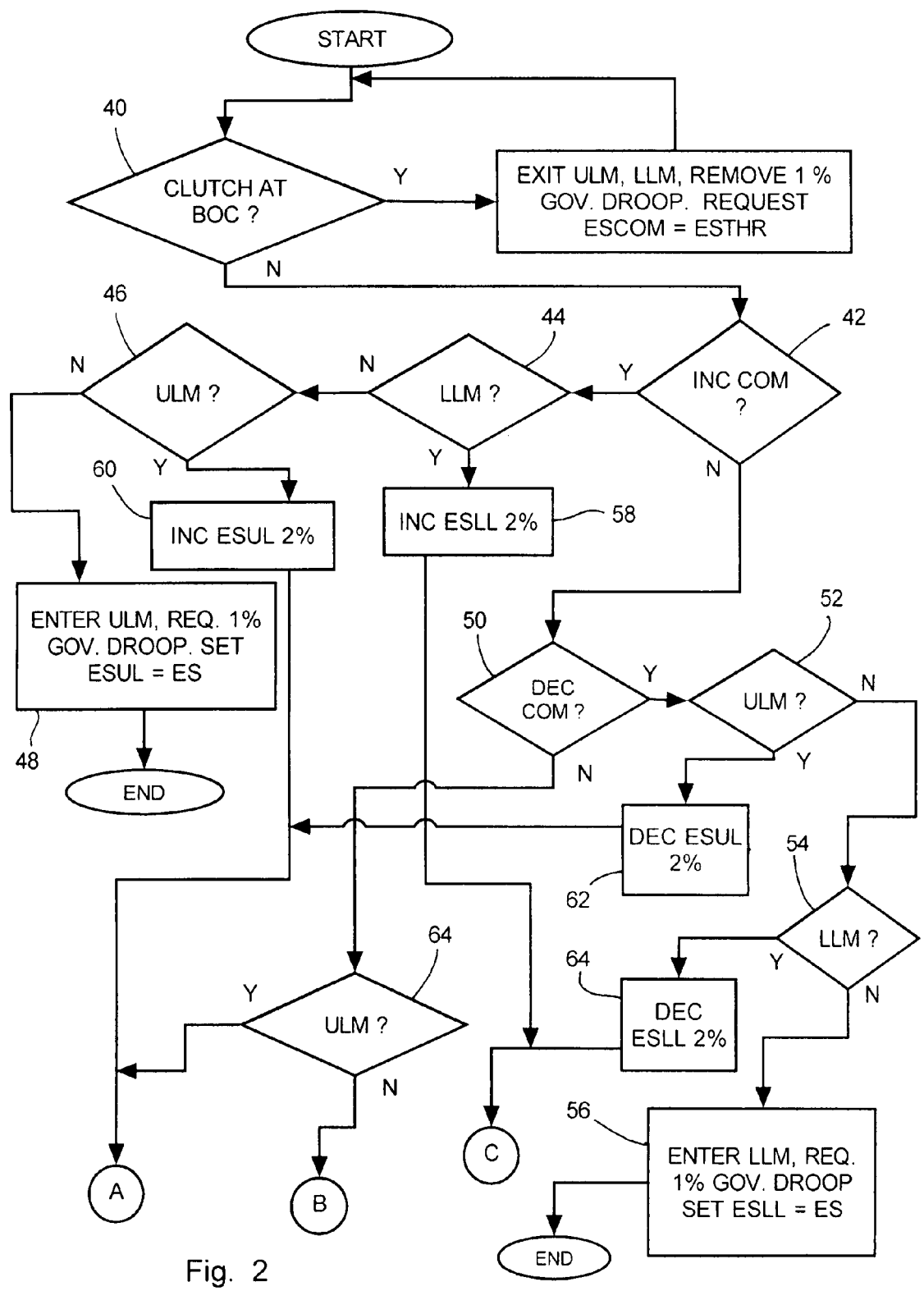
FIG. 2 is a top level flow diagram of the high low cruise control system.
Figure 2:
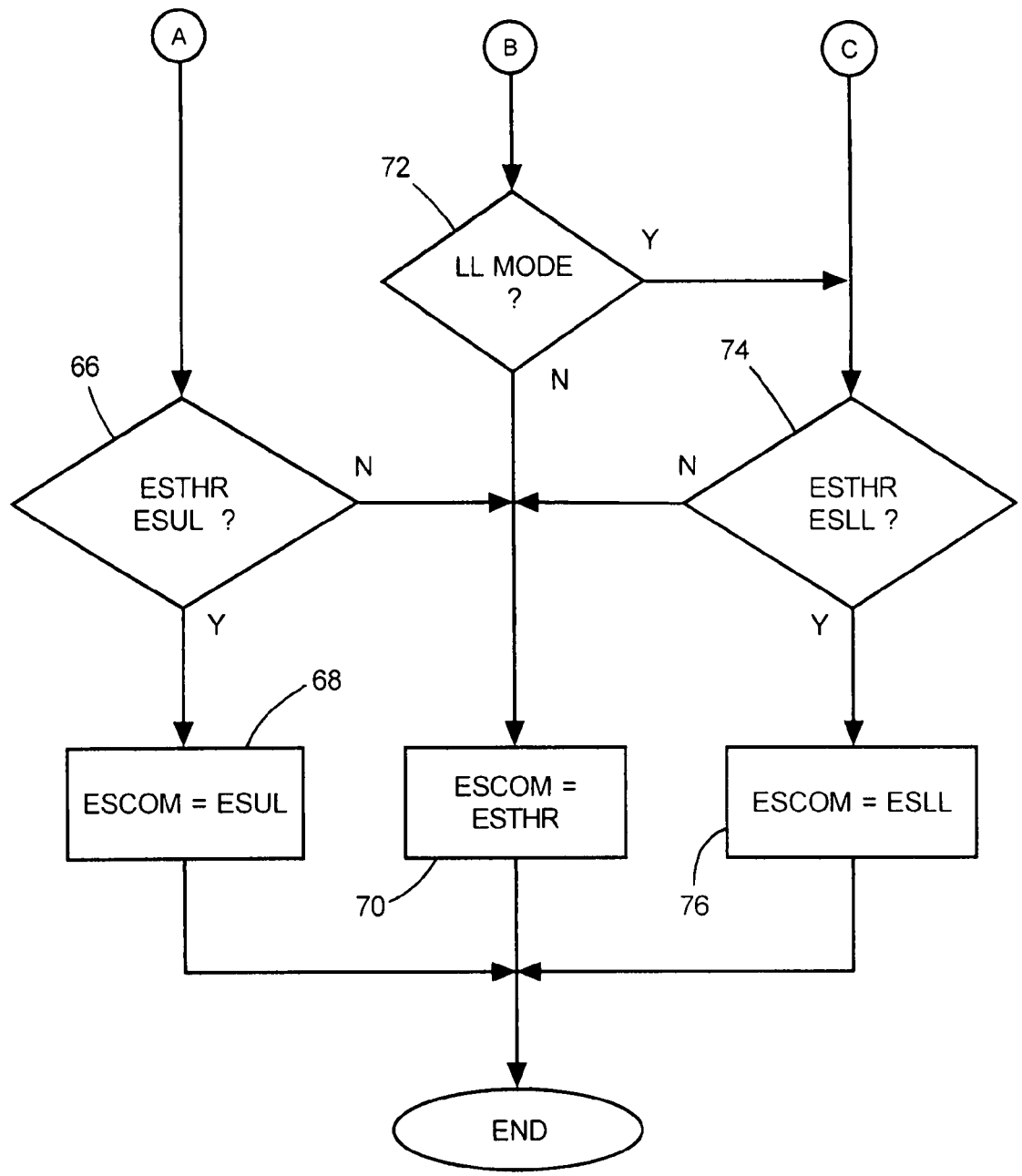

A high level logic diagram of HLCC 30 is shown in FIG. 2. HLCC 30 checks for cancellation by determining whether clutch pedal 20 is at the BOC position at decision block 40. If clutch pedal 20 is not at the BOC position, HLCC 30 checks switch 26 INC for a command at decision block 42. If INC is commanded, HLCC 30 determines whether that INC command initializes ULM 32 or increases a previously established limit. In other words, HLCC 30 checks whether LLM 34 and ULM 32 are active at decision blocks 44 and 46 respectively. If, in response to switch 26 INC command, neither mode is active, HLCC 30 enters ULM 32, requests a 1% governor 14 droop, and sets an engine speed upper limit (ESUL) to the present engine speed (ES) at block 48. If INC is not commanded at decision block 42, HLCC 30 checks switch 26 DEC for a command at decision block 50. If DEC is commanded, HLCC 30 determines whether that DEC command initializes LLM 34 or decreases a previously established limit. In other words, HLCC 30 checks whether ULM 32 and LLM 34 are active at decision blocks 52 and 54 respectively. If, in response to switch 26 DEC command, neither mode is active, HLCC 30 enters LLM 34, requests a 1% governor 14 droop, and sets an engine speed lower limit (ESLL) at the present engine speed (ES) at block 56.

If switch 26 INC is commanded at decision block 42 and LLM 34 is active, as determined at decision block 44, the established engine speed lower limit (ESLL) is incremented by 2% at block 58. However, if switch 26 INC is commanded at decision block 42, LLM 34 is inactive, as determined at decision block 44, and ULM 32 is active, as determined at decision block 46, the established engine speed upper limit (ESUL) is incremented by 2% at block 60. Alternately, if switch 26 DEC is commanded at decision block 50, and ULM 32 is active, as determined at decision block 52, the established engine speed upper limit (ESUL) is decremented by 2% at block 62. However, if switch 26 DEC is commanded at decision block 50, ULM 32 is inactive, as determined at decision block 52, and LLM 34 is active, as determined at decision block 54, the established engine speed lower limit (ESLL) is decremented by 2% at block 64. Once the engine speed limit (ESUL or ESLL) is adjusted by switch 26 INC or DEC command at block 58, 60, 62, or 64, the engine speed associated with throttle 18 position (ESTHR) is compared to the engine speed limit (ESUL or ESLL) at decision blocks 66 or 74 as will be described below.

When the operator is not initiating or adjusting the engine speed limit (ESUL or ESLL), no switch 26 INC or DEC command is found at decision blocks 42 and 50. HLCC 30 determines if ULM 32 or LLM 34 is active using a previously established engine speed limit (ESUL or ESLL), or if neither ULM 32 nor LLM 34 is active, and engine speed associated with throttle 18 position is not limited. In other words, HLCC 30 determines if ULM 32 is active at decision block 64. If ULM 32 is active, engine speed associated with throttle 18 position (ESTHR) is compared to the established engine speed upper limit (ESUL) at decision block 66. If engine speed associated with throttle 18 position (ESTHR) is greater than the engine speed upper limit (ESUL), then engine speed command associated with throttle 18 (ESCOM) is limited to engine speed upper limit (ESUL) at block 68. If engine speed associated with throttle 18 position (ESTHR) is not greater than the engine speed upper limit (ESUL) at block 68, then engine speed command associated with throttle 18 (ESCOM) is set to engine speed associated with throttle 18 position (ESTHR) at block 70. If HLCC 30 determines ULM 32 is inactive at decision block 64, it checks decision block 72 to determine if LLM 34 is active. If LLM 34 is active, engine speed associated with throttle 18 position (ESTHR) is compared to the established engine speed lower limit (ESLL) at decision block 74. If engine speed associated with throttle 18 position (ESTHR) is less than the engine speed lower limit (ESLL), then engine speed command associated with throttle 18 (ESCOM) is limited to engine speed lower limit (ESLL) at block 76. If engine speed associated with throttle 18 position (ESTHR) is not less than the engine speed lower limit (ESLL), then engine speed command associated with throttle 18 (ESCOM) is set to engine speed associated with throttle 18 position (ESTHR) at block 70. If neither ULM 32 is active at decision block 64 nor LLM 34 is active at decision block 72, then engine speed command associated with throttle 18 (ESCOM) is set to engine speed associated with throttle 18 position (ESTHR) at block 70.

Cancellation of HLCC 30 is accomplished at any time by depression of clutch pedal 20 to the BOC position. Returning to decision block 40, if clutch pedal 20 is at the BOC position, HLCC 30 is canceled, the system is exits ULM 32 or LLM 34, the 1% governor 14 droop request is removed, allowing governor 14 to return to its nominal operation, and engine speed command associated with throttle 18 (ESCOM) is set to engine speed associated with throttle 18 position (ESTHR) at block 70.

Accelerator pedal 22 and/or decelerator pedal 24 inputs will not be limited by HLCC 30. These inputs 22, 24 allow the operator to increase engine speed above ESUL when in ULM 32, or decrease engine speed below ESLL when in LLM 34 without exiting HLCC 30.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A high low cruise control system for controlling an engine speed of a work machine, comprising:
   a first input positionable by an operator at a selected position within a range of positions for selecting a corresponding engine speed within a range of engine speeds;
   a second input operable by the operator for initiating or adjusting operation of a first mode or a second mode;
   a third input operable by the operator to disable the first mode or the second mode; and
   a controller operable for receiving the first input, the second input, the third input, and information representative of the engine speed of the work machine, and outputting a signal representative of an engine speed command;
   the controller being operable in response to operation of the second input with a first command to initiate operation of the controller in the first mode for setting a first mode engine speed limit based on a first selected position of the first input, and thereafter being operable for adjusting the first mode engine speed limit based solely on operation of the second input in at least one predetermined manner and independent of the position of the first input and the engine speed, and for determining the engine speed command based on comparison of the first mode engine speed limit and the engine speed corresponding to the position of the first input at that time;
   the controller being operable in response to operation of the second input with a second command to initiate operation of the controller in the second mode for setting a second mode engine speed limit based on a second selected position of the first input, and thereafter being operable for adjusting the second mode engine speed limit based solely on operation of the second input in at least one predetermined manner and independent of the position of the first input and the engine speed, and for determining the engine speed command based on comparison of the second mode engine speed limit and the engine speed corresponding to the position of the first input at that time; and
   the controller being operable in absence of the first mode and the second mode for determining the engine speed command based on the engine speed corresponding to the position of the first input at that time.

2. The high low cruise control system of claim 1 wherein the controller is operable in the first mode to limit the engine speed command to an upper limit, and in the second mode to limit the engine speed command to a lower limit.

3. The high low cruise control system of claim 1 wherein the first input is a throttle control.

4. The high low cruise control system of claim 1 wherein the second input is a three position switch, and operation of the second input with the first command comprises movement of the switch to a first position, and operation of the second input with the second command comprises movement of the switch to a second position.

5. The high low cruise control system of claim 1, the controller being further operable upon operation of the second input by the operator with the first command,
   when operating in absence of either the first mode or the second mode, to initiate the first mode, or
   when operating in the first mode, to incrementally increase the first mode engine speed limit, or
   when operating in the second mode, to incrementally increase the second mode engine speed limit, or
   upon operation of the second input by the operator with the second command,
   when operating in absence of either the first mode or the second mode, to initiate the second mode, or
   when operating in the first mode, to incrementally decrease the first mode engine speed limit, or
   when operating in the second mode, to incrementally decrease the second mode engine speed limit.

6. The high low cruise control system of claim 1 wherein the third input is a clutch.

7. The high low cruise control system of claim 1 further comprising an input that can be operated to command the work machine engine speed to operate outside the first mode engine speed limit or the second mode engine speed limit.

8. A high low cruise control system for controlling engine speed of a work machine, comprising:
   a throttle positionable at a selectable position within a range of positions for selecting a corresponding engine speed within a range of engine speeds;
   an input device operable by an operator for initiating a maximum engine speed throttle command or a minimum engine speed throttle command based on the selected position of the throttle at that time, and thereafter the maximum engine speed throttle command or the minimum engine speed throttle command being incrementally adjustable by operation solely of the input device in at least one predetermined manner and regardless of the position of the throttle and the engine speed; and
   a controller operable for comparing the engine speed corresponding to the selected throttle position to the maximum engine speed throttle command or the minimum engine speed throttle command, and
   outputting an engine speed throttle command equal to the engine speed corresponding to the throttle position when the engine speed corresponding to the throttle position is less than the maximum engine speed throttle command or is greater than the minimum engine speed throttle command,
   equal to the maximum engine speed throttle command when the engine speed corresponding to the throttle position is greater than or equal to the maximum engine speed throttle command, or
   equal to the minimum engine speed throttle command when the engine speed corresponding to the throttle position is less than or equal to the minimum engine speed throttle command.

9. The engine speed control system of claim 8, further comprising an operator disengage, wherein upon selection of the operator disengage, the engine speed throttle command is based on the engine speed associated with the selected throttle position.

10. The engine speed control system of claim 8, further comprising an accelerator pedal, wherein depression of the accelerator pedal allows operation of the work machine above the maximum engine speed throttle command.

11. The engine speed control system of claim 8, further comprising a decelerator pedal, wherein depression of the decelerator pedal allows operation of the work machine below the minimum engine speed throttle command.

12. A method for controlling an engine speed of a work machine, comprising the steps of:
- providing a first input positionable by an operator at a selected position within a range of positions for selecting a corresponding engine speed within a range of engine speeds;
- providing a second input operable by the operator for initiating or adjusting operation of the system in a first mode or a second mode;
- providing a third input operable by the operator to disable the first mode or the second mode; and
- providing a controller operable for
- receiving the first input, the second input, the third input, and information representative of the engine speed of the work machine, and outputting a signal representative of an engine speed command;
- initiating the first mode and setting a first mode engine speed limit based on a first selected position of the first input in response to a first command of the second input, and thereafter adjusting the first mode engine speed limit based solely on operation of the second input in at least one predetermined manner and independent of the position of the first input and the engine speed, and determining the engine speed command based on comparison of the first mode engine speed limit and the engine speed corresponding to the position of the first input at that time;
- initiating the second mode and setting a second mode engine speed limit based on a second selected position of the first input in response to a second command of the second input, and thereafter adjusting the second mode engine speed limit based solely on operation of the second input in at least one predetermined manner and independent of the position of the first input and the engine speed, and determining the engine speed command based on comparison of the second mode engine speed limit and the engine speed corresponding to the position of the first input at that time; and
- in absence of the first mode and the second mode determining the engine speed command based on the engine speed corresponding to the position of the first input at that time.

* * * * *